United States Patent
Harris

(10) Patent No.: US 7,768,761 B2
(45) Date of Patent: Aug. 3, 2010

(54) SURGE PROTECTION DEVICE

(75) Inventor: Richard A. Harris, Palo Alto, CA (US)

(73) Assignee: Bourns, Inc., Riverside, CA (US)

( * ) Notice: Subject to any disclaimer, the term of this patent is extended or adjusted under 35 U.S.C. 154(b) by 672 days.

(21) Appl. No.: 11/667,193

(22) PCT Filed: Nov. 11, 2005

(86) PCT No.: PCT/AU2005/001721

§ 371 (c)(1),
(2), (4) Date: May 3, 2007

(87) PCT Pub. No.: WO2006/050568

PCT Pub. Date: May 18, 2006

(65) Prior Publication Data

US 2008/0192394 A1    Aug. 14, 2008

(30) Foreign Application Priority Data

Nov. 12, 2004  (AU) .............................. 2004906473

(51) Int. Cl.
*H02H 9/00* (2006.01)
(52) U.S. Cl. ........................................ 361/111; 361/56
(58) Field of Classification Search ................. 361/111, 361/56
See application file for complete search history.

(56) References Cited

U.S. PATENT DOCUMENTS 5,130,883 A * 7/1992 Edwards .................... 361/91.1
5,257,156 A * 10/1993 Kirkpatrick ................... 361/18
7,102,864 B2 * 9/2006 Liu et al. ....................... 361/56

FOREIGN PATENT DOCUMENTS

| GB | 2281815 A | 3/1995 |
| SU | 602932 | 4/1978 |
| WO | WO93/01639 | 1/1993 |

* cited by examiner

*Primary Examiner*—Stephen W Jackson
(74) *Attorney, Agent, or Firm*—Lumen Patent Firm

(57) ABSTRACT

An electrical surge protection device (12) confers protection to an output node (13) from electrical surges on a data or power line (10) incident on an input node (11). A transistorized surge protection device (18) is located in a current path between the input node (11) and the output node (13) and is configured to assume an isolating state in response to an over-current therethrough. A voltage-triggered protective circuit comprising a diac (16) in series with a bi-directional zener diode (14) is connected between the output side of the transistorized surge protection device (18) and a surge sinking node (15). The voltage-triggered circuit assumes a low-impedance state in response to an electrical surge at output terminal 13. Consequently a surge current is passed through zener diode (14) and surge diac (16) to the surge sinking node. In response to the surge current the transistorized surge protection device (18) assumes a high impedance configuration thereby isolating output node (13) from input node (11). Since neither the zener diode and diac combination, nor the transistorized surge protection device (18) are subject to sustained surge associated currents, embodiments of the invention can be compactly packaged.

14 Claims, 3 Drawing Sheets

SURGE PROTECTION DEVICE

FIELD OF THE INVENTION

The present invention relates to an electronic circuit for protecting equipment, such as data processing and communication equipment, from potentially damaging voltage surges.

BACKGROUND TO THE INVENTION

A reference to any prior art in this specification is not, and should not be taken as an acknowledgement or any form of suggestion that the prior art forms part of the common general knowledge.

Various approaches have been taken in the past to protecting electronic equipment from potentially damaging voltage surges due to, for example, lightning strikes and power supply malfunctions.

These approaches include the use of circuits incorporating metal oxide varistors (MOVs) and gas discharge tubes to short surges to ground before they are able to damage connected equipment. Such circuits are typically bulky and may have large associated capacitances which are undesirable.

A circuit which does not make use of gas discharge tubes is described in U.S. Pat. No. 4,695,916 and reproduced herein as FIG. 1. The circuit 2 includes a bi-directional thyristor 4, or as it is sometimes called a "diac", in series with a bi-directional zener diode 6. Alternatively a Sidac may be preferred in some applications. The SIDAC is a silicon bilateral voltage triggered switch with greater power handling capabilities than standard DIACs. Upon application of a voltage exceeding the SIDAC breakover voltage point, the SIDAC switches on through a negative resistance region to a low on-state voltage. Conduction will continue until the current is interrupted or drops below the minimum holding current of the device.

Zener diode 6 has a breakdown voltage $V_B$ slightly higher than power supply voltage $V_{ps}$ on signal line 10. The sum $(V_{BO}+V_B)$ of breakover voltage $V_{BO}$ of diac 4 and breakdown voltage $V_B$ is set to be lower than the breakdown voltage $V_R$ of equipment 8 but is higher than that equipment's minimum operational voltage $V_a$. In the event of a surge being applied to line 10 then the voltage across circuit 2 will rise. Upon the voltage across circuit 2 reaching $(V_{BO}+V_B)$ the diac turns on effectively shorting zener diode 6 to rail 10. At the same time zener diode 6 becomes voltage limiting. The voltage between line 10 and ground is then held well below $V_R$ as it is the sum of the fixed breakdown voltage $V_B$ of the zener diode plus the operating voltage of the diac which is typically a few volts.

Whilst the circuit of FIG. 1 is relatively quick-acting and overcomes the problems associated with the use of gas discharge tubes, problems are encountered in the event of the surge being sustained. For example, in U.S. Pat. No. 4,695,916 it is explained that where protection from lightning surges lasting 1-msec is required then the diac may be made having a chip area as small as about 4 mm². However, surges may last longer than 1-msec. For example, a surge due to malfunction of power supply equipment coupled to line 10 may last for several seconds. In that case circuit 2 would likely be destroyed whilst dissipating power associated with the surge in the form of heat. The destruction of circuit 2 during a surge would leave equipment 8 vulnerable to damage which is highly undesirable.

In light of the above, it is an object of the present invention to provide an electronic surge protection apparatus which is an improvement on the prior art devices described thus far.

SUMMARY OF THE INVENTION

According to a first aspect of the present invention there is provided an electrical surge protection apparatus including:

one or more current paths each between corresponding one or more input nodes and one or more output nodes, each current path including a corresponding transistorised surge protection device configured to assume an isolating state in response to an over-current therethrough;

a voltage-triggered protective circuit configured to assume a low impedance in response to an overvoltage thereacross coupling points on the current paths between the transistorised surge protection devices and the output nodes to one or more surge sinking nodes;

wherein, upon said voltage-triggered circuit assuming the low-impedance a surge current is passed through one or more of the transistorised surge protection devices to said surge sinking nodes in response to which surge current said transistorised surge protection devices assume the high impedance configuration thereby isolating corresponding output nodes from corresponding input nodes.

In one embodiment the one or more surge sinking nodes comprise a connection between the voltage-triggered circuit and other of the one or more current paths. This arrangement is particular applicable where only protection from differential mode surges is required.

Alternatively, in other embodiments, for example to provide common mode surge protection, the one or more surge sinking nodes comprise an earth connection point.

In one embodiment, where the surge sinking nodes comprise an earth connection point, and the apparatus has first and second current paths, the voltage triggered circuit comprises a star circuit of three branches, each branch emanating from a common node a first branch terminating at a first output node corresponding to the first current path;

a second branch terminating at a second output node corresponding to the second current path and a third branch terminating at the surge sinking node, said apparatus further including a second transistorised surge protection device disposed in a path between the second input node and the second output node.

In the preferred embodiments the voltage triggered protective circuit comprises a crowbar-type device.

More particularly, the voltage triggered protective circuit may include any one of:

a Shockley diode, silicon symmetrical switch element, diac, triac with an open gate terminal, Sidac.

Preferably the voltage-triggered protective circuit comprises a crow-bar type device in series with a voltage limiting element.

More particularly, the voltage limiting element may comprise a zener diode (avalanche diode) or a varistor.

The voltage limiting element preferably comprises a bi-directional zener diode.

Preferably the crowbar type device comprises a diac.

The surge protection apparatus may be arranged to provide differential mode protection at said output nodes.

Alternative embodiments may be arranged to provide differential and common mode protection at said output nodes.

The apparatus can be conveniently provided as a single package circuit board mountable electronic circuit device.

According to a further aspect of the present invention there is provided a method for preventing damage to equipment from an electrical surge incident upon a line connected to the equipment, the method including the steps of:

shorting the electrical surge through a first circuit to a potential point below a damage threshold of the equipment; and rapidly isolating the first circuit from the line prior to damage to the first circuit occurring.

In a further aspect there is provided a surge protection circuit including:

a voltage-triggered protective circuit arranged to short-circuit a voltage surge at an output terminal of the apparatus; and a transistorised current-triggered protection circuit located in a path between an input terminal and the output terminal and arranged to assume an open circuit configuration in response to triggering of said voltage-triggered protective circuit.

In another embodiment there is provided a surge protection apparatus including a plurality of circuits to provide surge protection between a number of input connection points and a corresponding number of output connection points.

Further features of the present invention will be described in the following detailed description, which will refer to a number of figures as follows.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the appended claims in any way. The Detailed Description will make reference to a number of drawings as follows:

DETAILED DESCRIPTION OF EXEMPLARY EMBODIMENTS

Figure 1:
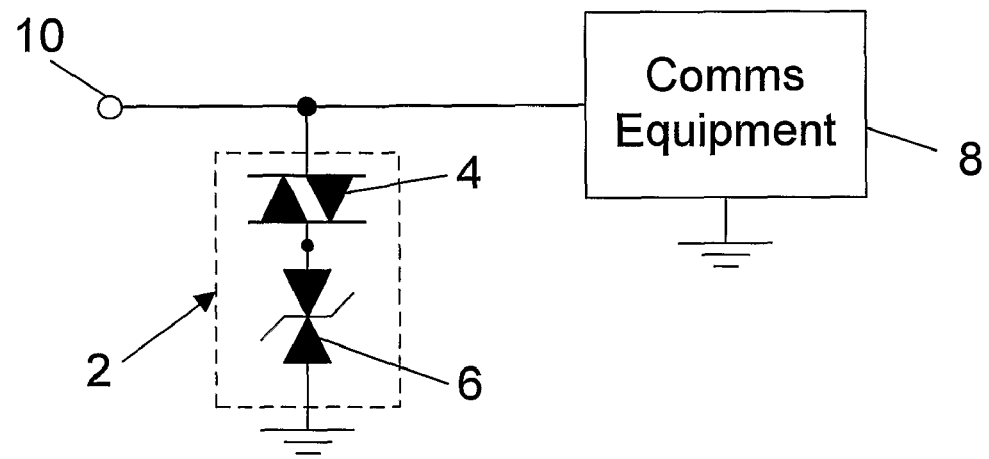
FIG. 1 is schematic diagram of a prior art surge protection device.

Throughout the following description like reference numerals are used to refer to like items that appear in the referenced figures.

Figure 2:
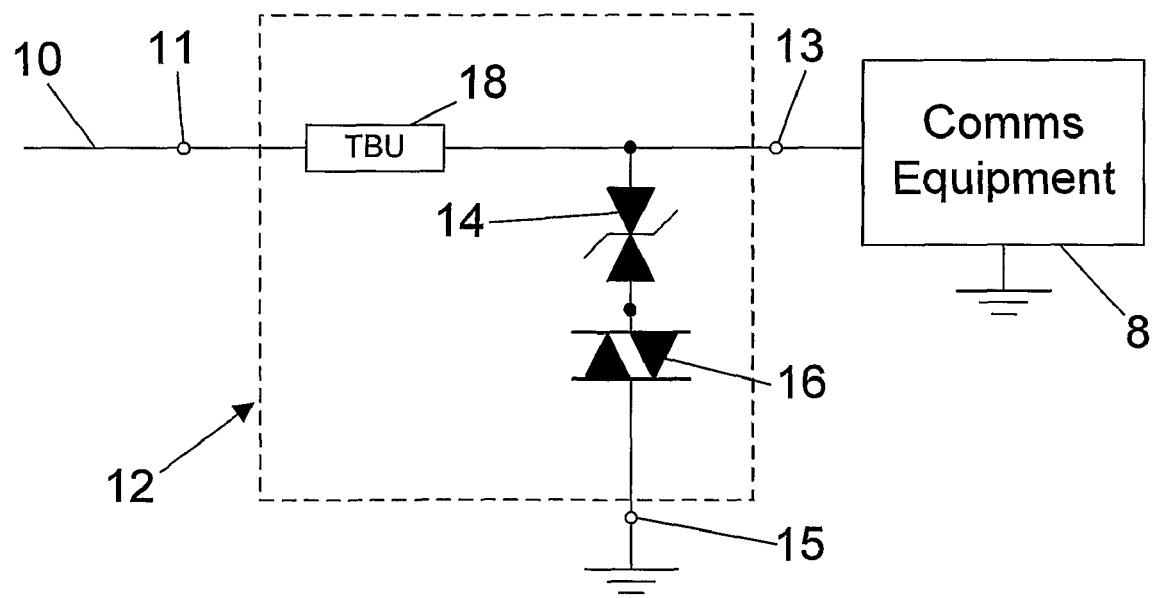
FIG. 2 is a schematic diagram of a bidirectional surge protection apparatus according to a first embodiment of the present invention.

FIG. 2 depicts a surge protection circuit 12 according to a first embodiment of the present invention in use. Circuit 12 is connected, at input node 11, to a data or power supply line 10 and, at output node 13, to communication equipment 8. A surge sinking node, in the form of earth connection point 15, is connected to ground. Circuit 12 is designed to protect communication equipment 8 from voltage surges on line 10 as might be associated with a lightning strike or power supply malfunction. The circuit includes a series connected transient blocking unit (TBU) 18. TBU's are transistorised surge protection devices configured to assume an isolating state in response to an over-current passing through them. That is, they are transistor-based circuits configured to rapidly assume a very high impedance, i.e. to effectively open circuit or disconnect, in response to the current through them attaining a predetermined over-current trigger level. Suitable devices can be sourced from Fultec Semiconductor Inc. of 2029 Stierlin Court, Suite 120, Mountain View, Calif. 94043. Detailed descriptions of TBU devices appear in the patent specifications of international patent application PCT/AU2004/001117 (WO 2005/020402) and in PCT/AU94/00358 (WO 95/01667) both by the present inventor and both of which are hereby incorporated in their entireties by reference.

Connected in series between the output side of the TBU and ground is a voltage-triggered protective circuit comprising a voltage clamping device in the form of zener diode 14 and a crowbar device in the form of diac 16. The triggering parameters of each of the three components in circuit 12 are $I_f$, being the trigger current of the TBU, $V_B$ being the breakdown voltage of zener diode 14 and $V_{BO}$ being the break-over voltage of diac 16. The zener diode and diac are selected so that the sum $(V_B+V_{BO})$ of their breakdown voltage and breakover voltage is less than the breakdown voltage $V_r$ of communications equipment 8 but higher than the equipment's minimum operational voltage $V_A$. The TBU is selected so that its trigger current $I_f$ exceeds the maximum current drawn by equipment 8 during normal operation.

In normal operation current below $I_f$ flows through TBU 18 to power equipment 8 and the voltage across the series combination of zener diode 14 and diac 16 is greater than $V_A$ and less than $(V_B+V_{BO})$. In the event of a potentially damaging surge being incident on line 10 then the voltage across the series combination of zener diode 14 and diac 16 will rise so that it attains $(V_B+V_{BO})$ at which point diac 16 effectively short circuits and zener diode 14 clamps. The voltage across the series combination of zener diode 14 and diac 16 will then be equivalent to the sum of the forward operating voltage of diac 16, usually a few volts, and the breakdown voltage of the zener diode, say 75V. Accordingly, a very large voltage difference will then exist between line 10 on the input side of TBU 18 and the junction of the TBU and zener diode 14. Consequently the current through TBU 18 will rapidly rise to the trigger current level $I_f$. In response to the current through the TBU reaching the trigger current level the TBU very rapidly assumes an open-circuit configuration. The time in which the TBU assumes the open-circuit configuration in response to the trigger current is typically a microsecond.

Advantageously, open-circuiting of TBU 18 prevents any further surge current flowing through zener diode 14 and diac 16. Consequently, zener diode 14 and diac 16 are only exposed to the surge for the time that it takes from them to trigger, to the time that it takes TBU 18 to trigger. That time is typically of less than a microseconds As a result the zener diode 14 and the diac 16 can be made very small as the period of time during which they have to dissipate the surge is extremely short. Capacitances associated with the zener diode and diac are also very small so that the protector circuit can be employed for high-speed, wide-bandwidth communication applications into the GHz range.

Figure 3:
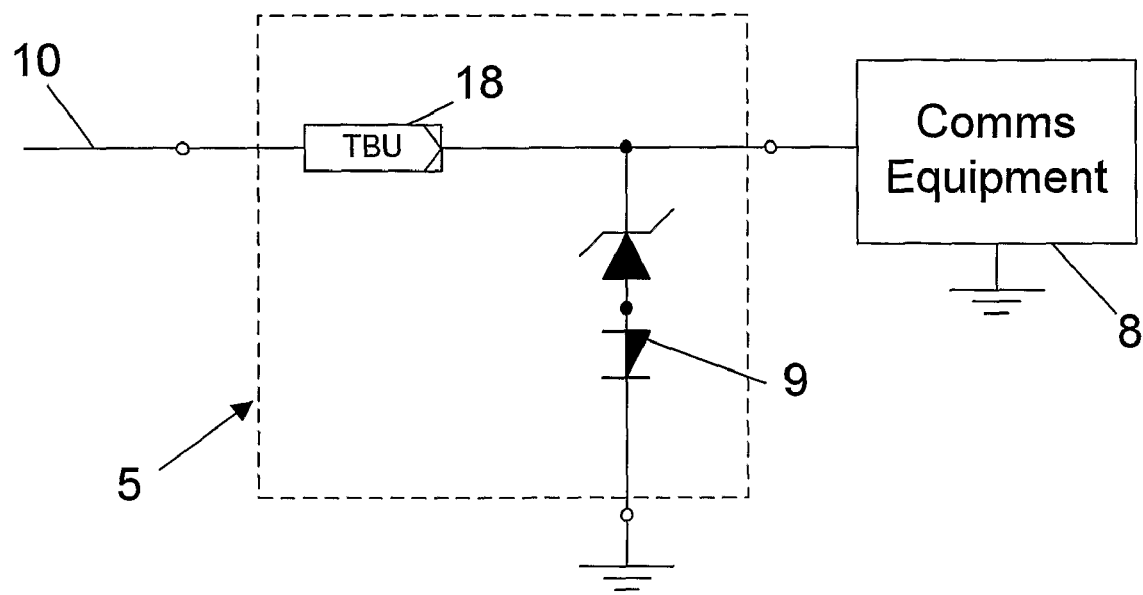
FIG. 3 is a schematic diagram of a unidirectional surge protection apparatus according to a further embodiment of the present invention.

In the presently described embodiment of the invention TBU 18, zener diode 14 and diac 16 are all bi-directional in order that circuit 12 provide protection to both positive-going and negative-going voltage surges incoming on line 10. However, if in a particular situation only surges in one direction are likely to be encountered then appropriate unidirectional components can be used to implement circuit 5 shown in FIG. 3. In particular, the bi-directional diac can be replaced by a Shockley diode 9 or similarly functioning unidirectional crowbar-type component.

Whilst it is preferable that circuit 12 includes zener diode 14 the circuit will operate with only the diac between the output of TBU 18 and ground. However, incorporation of the zener diode is advantageous because it assists in resetting the diac back to its non-conducting state after the surge has passed, especially when the circuit normally has a dc voltage impressed on it capable of holding the diac in the short circuit state.

Figure 4:
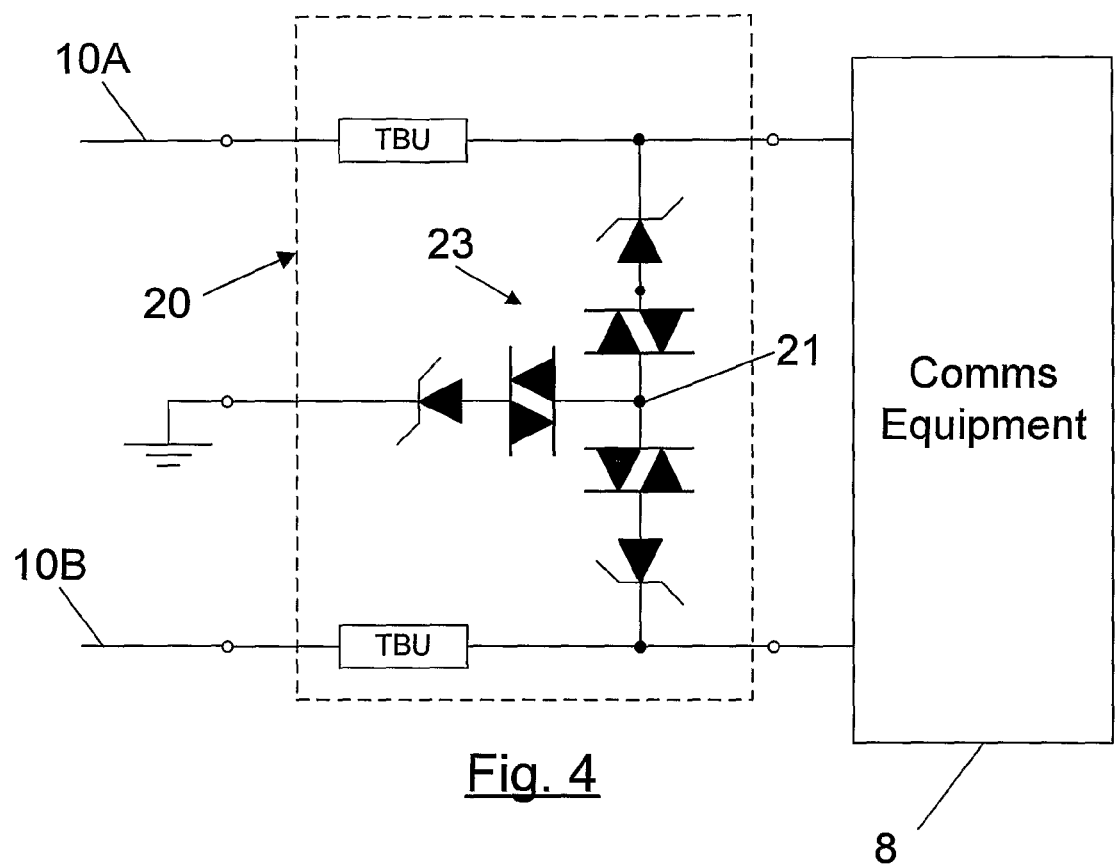
FIG. 4 is a schematic diagram of a bi-directional surge protection apparatus according to another embodiment of the present invention.

FIG. 4 depicts a circuit 20 according to a further embodiment of the invention arranged to provide protection to communication equipment 8 located at the end of balanced lines 10A, 10B. The circuit includes a voltage-triggered protective circuit 23 consisting of a star circuit having three branches, each branch emanating form a common node 21. It will be realised that circuit 20 provides bidirectional protection in response to common mode and differential surges on lines 10A and 10B. In the embodiment shown the circuit of FIG. 4 provides protection to two current paths defined between two output nodes and two corresponding input nodes each current path containing a TBU. It will be realised that the circuit can be readily adapted to provide protection for a greater number of current paths by increasing the number of branches of the star circuit 23 and providing a further TBU in each of the additional current paths.

Figure 5:
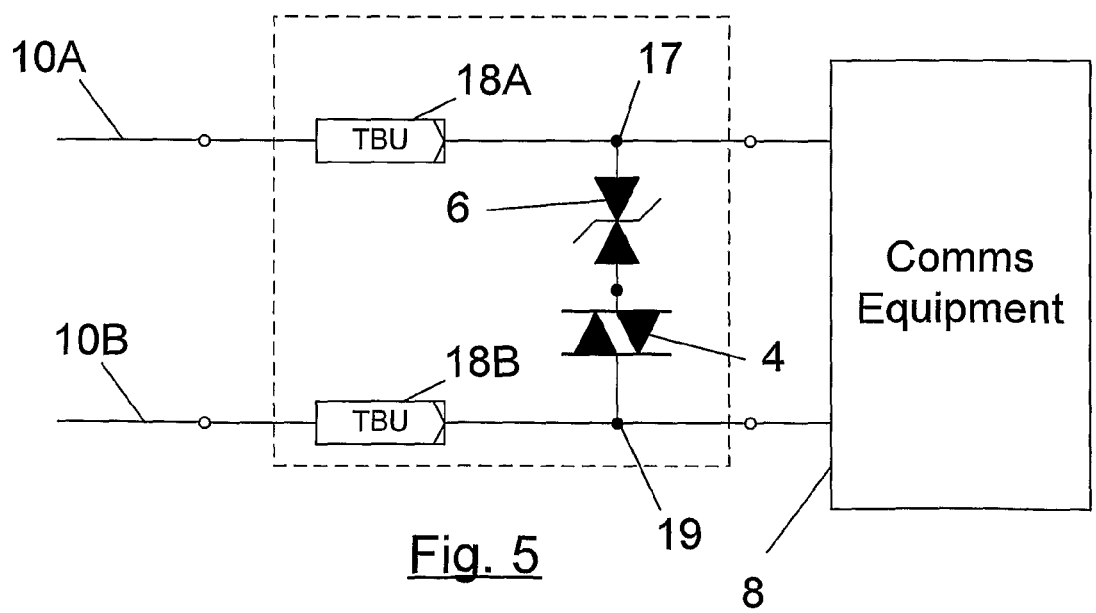
FIG. 5 is a schematic diagram of a differential mode bi-directional protection apparatus according to a further embodiment of the present invention.

As previously explained, because the TBU devices prevent sustained passage of surges through the clamping and crowbar devices to ground, those devices can be made very small. Recently integrated circuit versions of the TBUs have been proposed and are disclosed in the aforementioned specification of PCT/AU2004/001117. Consequently surge protection circuits according to the present invention may be provided in small packages. Referring now to FIG. 5, there is depicted a bi-directional differential mode surge protection circuit 22 according to a further embodiment of the present invention. The circuit of FIG. 5 includes unidirectional TBUs 18A and 18B, reversely orientated relative to each other and a bi-directional series zener diode and diac combination. For example, in the event of a positive-going surge being incident on line 10A then the voltage between node 17 and node 19 will exceed the sum of the breakdown and breakover voltages of zener diode 6 and diac 4 respectively. Consequently diac 4 will effectively short zener diode 6 to node 19. At the same time zener diode 6 assumes a clamping state so that there is current differential between rail 10A and node 17 so that current through TBU 18A rapidly attains that TBU's trigger current thereby causing it to very rapidly assume an open-circuit state.

Figure 6:
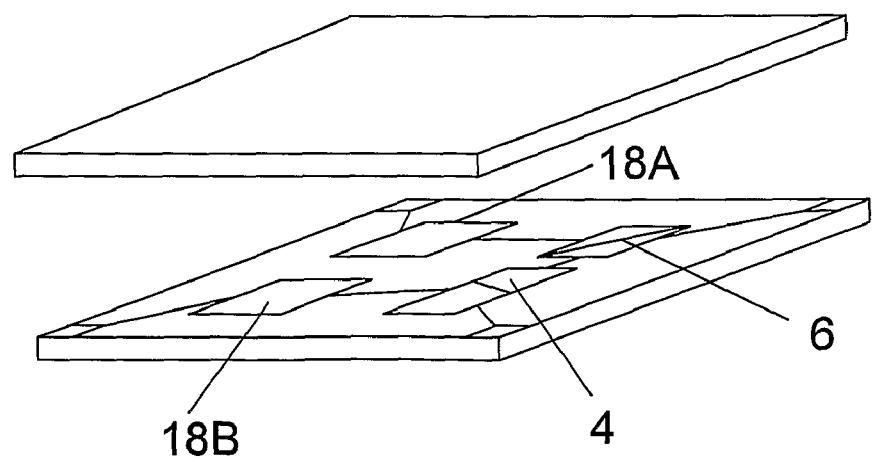
FIG. 6 is an exploded diagram of a packaged device according to an embodiment of the present invention.

A surge protection apparatus according to FIG. 5 is particularly suitable for protecting computers from differential mode surges over local area network cables. FIG. 6 depicts a surface mount DIL package of the circuit, split in two to reveal the interior, that may be readily incorporated onto PCBs such as network interface cards for example.

The embodiments of the invention described herein are provided for purposes of explaining the principles thereof, and are not to be considered as limiting or restricting the invention since many modifications may be made by the exercise of skill in the art without departing from the scope of the following claims.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of the following claims are intended to invoke paragraph six of U.S.A. Statute 35 USC section 112 unless the exact words "means for" are followed by a participle.

The claims as filed are intended to be as comprehensive as possible and no subject matter is intentionally relinquished, dedicated or abandoned.

The invention claimed is:

1. An electrical surge protection apparatus including:
one or more current paths each between corresponding one or more input nodes and one or more output nodes, each current path including a corresponding transistorised surge protection device configured to assume an isolating state in response to an over-current therethrough;
a voltage-triggered protective circuit configured to assume a low impedance in response to an overvoltage thereacross coupling points on the current paths between the transistorised surge protection devices and the output nodes to one or more surge sinking nodes;
wherein,
upon said voltage-triggered circuit assuming the low-impedance a surge current is passed through one or more of the transistorised surge protection devices to said surge sinking nodes in response to which surge current said transistorised surge protection devices assume the high impedance configuration thereby isolating corresponding output nodes from corresponding input nodes.

2. An electrical surge protection apparatus according to claim 1, wherein the one or more surge sinking nodes comprise a connection between the voltage-triggered circuit and other of the one or more current paths.

3. An electrical surge protection apparatus according to claim 1, wherein the one or more surge sinking nodes comprise an earth connection point.

4. An electrical surge protection apparatus according to claim 3, comprising first and second current paths, wherein the voltage triggered circuit comprises a star circuit of three branches, each branch emanating from a common node
a first branch terminating at a first output node corresponding to the first current path;
a second branch terminating at a second output node corresponding to the second current path and a third branch terminating at the surge sinking node, said apparatus further including a second transistorised surge protection device disposed in a path between the second input node and the second output node.

5. An apparatus according to claim 1, wherein the voltage triggered protective circuit comprises a crowbar-type device.

6. An apparatus according to claim 5, wherein the voltage triggered protective circuit includes any one of:
a Shockley diode,
silicon symmetrical switch element,
diac,
triac with an open gate terminal,
Sidac.

7. An apparatus according to claim 1, wherein the voltage-triggered protective circuit comprises a crow-bar type device in series with a voltage limiting element.

8. An apparatus according to claim 7, wherein the voltage limiting element comprises a zener diode (avalanche diode) or varistor.

9. An apparatus according to claim 8, wherein the voltage limiting element comprises a bi-directional zener diode.

10. An apparatus according to claim 8, wherein the crowbar type device comprises a diac.

11. An apparatus according to claim 1 arranged to provide differential mode protection at said output nodes.

12. An apparatus according to claim 1 arranged to provide differential and common mode protection at said output nodes.

13. A single package circuit board mountable electronic circuit device including a surge protection apparatus according to claim 1.

14. An electrical surge protection apparatus including:
- one or more current paths each between corresponding one or more input nodes and one or more output nodes, each current path including a corresponding transistorised surge protection device configured to assume an isolating state in response to an over-current therethrough;
- a voltage-triggered protective circuit comprising a crowbar type device in series with a voltage limiting element, said protective circuit configured to assume a low impedance in response to an overvoltage thereacross, said protective circuit coupling points on the current paths between the transistorised surge protection devices and the output nodes to one or more surge sinking nodes;

wherein, upon said voltage-triggered circuit assuming the low-impedance a surge current is passed through one or more of the transistorised surge protection devices to said surge sinking nodes in response to which surge current said transistorised surge protection devices assume the high impedance configuration thereby isolating corresponding output nodes from corresponding input nodes.

* * * * *